(12) United States Patent
Bruemmer et al.

(10) Patent No.: US 11,306,634 B2
(45) Date of Patent: Apr. 19, 2022

(54) ARRANGEMENT WITH INTERNAL COMBUSTION ENGINE AND HEAT EXCHANGER

(71) Applicant: Mahle International GmbH, Stuttgart (DE)

(72) Inventors: Richard Bruemmer, Stuttgart (DE); Klaus Irmler, Tuebingen (DE); Falk Schneider, Korntal-Muechingen (DE)

(73) Assignee: Mahle International GmbH

( * ) Notice: Subject to any disclaimer, the term of this patent is extended or adjusted under 35 U.S.C. 154(b) by 0 days.

(21) Appl. No.: 15/930,430

(22) Filed: May 12, 2020

(65) Prior Publication Data

US 2020/0362736 A1 Nov. 19, 2020

(30) Foreign Application Priority Data

May 13, 2019 (DE) .......................... 102019206877.4
Jul. 25, 2019 (DE) .......................... 102019211015.0

(51) Int. Cl.
*F01N 3/02* (2006.01)
*F01N 13/10* (2010.01)

(52) U.S. Cl.
CPC .......... *F01N 3/0205* (2013.01); *F01N 13/10* (2013.01)

(58) Field of Classification Search
CPC . F01N 3/20; F01N 3/02; F01N 3/0205; F01N 5/02; F01N 13/10; F01N 2240/02; F01N 2260/02; F01N 2260/022; F01P 3/20; F02G 5/02; Y02T 10/12
USPC .................................. 60/289, 290, 299, 320
See application file for complete search history.

(56) References Cited

U.S. PATENT DOCUMENTS

| 5,934,073 | A | 8/1999 | Gieshoff et al. |
| 6,318,077 | B1* | 11/2001 | Claypole ............... F01N 3/2889 60/303 |
| 2006/0021332 | A1* | 2/2006 | Gaiser ................... F01N 3/0256 60/286 |
| 2017/0335748 | A1* | 11/2017 | Zhang ................. F28D 21/0003 |

FOREIGN PATENT DOCUMENTS

DE 19721439 A1 1/1999

OTHER PUBLICATIONS

Effects of LPG on the performance and emission characteristics of SI engine—An Overview by Kalra et al. (Year: 2014).*

* cited by examiner

*Primary Examiner* — Audrey B. Walter
*Assistant Examiner* — Dapinder Singh
(74) *Attorney, Agent, or Firm* — Fishman Stewart PLLC

(57) ABSTRACT

The present disclosure describes an arrangement for a motor vehicle including an internal combustion engine, a heat exchanger for cooling exhaust gas present in the internal combustion engine, and an exhaust system for discharging the exhaust gas. The heat exchanger has a channel system including at least one exhaust gas channel, through which an exhaust path leads, and at least one coolant channel, through which a coolant path of a coolant leads, fluidically separate from the exhaust gas path and arranged in a heat-transferring manner with the exhaust gas path for heat exchange during operation. A cooling gas outlet, opening into the exhaust gas path upstream of the channel system, is provided for introducing a cooling gas into the exhaust gas path upstream of the channel system.

19 Claims, 3 Drawing Sheets

ARRANGEMENT WITH INTERNAL COMBUSTION ENGINE AND HEAT EXCHANGER

CROSS-REFERENCE TO RELATED APPLICATIONS

This application claims priority to German Application No. DE 10 2019 211 015.0 filed on Jul. 25, 2019 and German Patent Application No. DE 10 2019 206 877.4 filed on May 13, 2019, the contents of each of which is hereby incorporated by reference in their entirety.

TECHNICAL FIELD

The present invention relates to an arrangement with an internal combustion engine and with a heat exchanger for the cooling of exhaust gas occurring in the internal combustion engine.

BACKGROUND

In the operation of an internal combustion engine, exhaust gas occurs, which is usually discharged via an exhaust system. The exhaust gas has high temperatures which are usually reduced by means of a heat exchanger which is integrated in the exhaust system. Such heat exchangers generally have a channel system which is flowed through on the one hand by the exhaust gas and on the other hand, fluidically separated from the exhaust gas and connected with the exhaust gas in a heat-transferring manner, is flowed through by a coolant. In operation, the coolant receives heat from the exhaust gas and therefore cools the exhaust gas. The heat exchanger and in particular the channel system are therefore exposed to high exhaust gas temperatures and are configured in such a way, in particular are produced from such materials, that they withstand the exhaust gas temperatures and chemical stresses by the exhaust gas.

The development of more energy-efficient internal combustion engines and/or increased requirements for environmental compatibility lead, in particular also through the use of new fuels or changed combustion methods, to the fact that the exhaust gas occurring in the internal combustion engine has increased temperatures. Also, depending on the fuel being used in the internal combustion engine, the exhaust gas can have various temperatures, so that for various fuels, corresponding adaptations of the heat exchanger, in particular with regard to the material composition, are necessary. With increasing exhaust gas temperatures in the region of the heat exchanger, in particular higher-quality materials are necessary, which increase the production costs of the heat exchanger. Without such an adaptation of the materials, a service life of the heat exchanger would be reduced, so that the heat exchanger and an arrangement with the heat exchanger and the internal combustion engine are more vulnerable, in particular have a reduced service life.

The present invention is therefore concerned with the object of indicating, for an arrangement with an internal combustion engine and with a heat exchanger for the cooling of exhaust gas of the internal combustion engine, an improved or at least different embodiment, which is distinguished in particular by a favourably priced production and/or improved stability.

This problem is solved according to the invention by the subject of the independent claim(s). Advantageous embodiments are the subject of the dependent claims.

SUMMARY

The present invention is based on the general idea, in an arrangement with an internal combustion engine and with a heat exchanger for the cooling of exhaust gas of the internal combustion engine, to admix a cooling gas with the exhaust gas upstream of the heat exchanger, so that the temperatures of the exhaust gas are reduced on reaching the heat exchanger. The reduced temperature of the exhaust gas leads, on the one hand, to the heat exchanger being able to be produced from more favourable materials, so that the production costs of the heat exchanger per se and the arrangement as a whole are reduced. In addition, the reduced temperature of the exhaust gas leads to the fact that damage to the heat exchanger, caused by the exhaust gas, is reduced, so that the heat exchanger and the arrangement have an increased stability. In particular, the idea according to the invention, through a needs-based cooling of the exhaust gas before the heat exchanger, allows the same heat exchanger to be used in arrangements in which internal combustion engines with different types of fuels are operated.

According to the idea of the invention, the arrangement has, in addition to the internal combustion engine and the heat exchanger, an exhaust system, which serves for the discharging of the exhaust gas of the internal combustion engine, and through which an exhaust gas path of the exhaust gas leads. The heat exchanger has a channel system which, in operation, is flowed through on the one hand by the exhaust gas, and on the other hand is flowed through by a coolant, wherein the coolant receives heat from the exhaust gas and thus cools the exhaust gas. The channel system has at least one exhaust gas channel through which the exhaust gas path leads. For this purpose, the channel system has at least one exhaust gas duct, through which the exhaust gas path leads. In addition, the channel system has at least one coolant duct, through which a coolant path of the coolant leads, fluidically separated from the exhaust gas path and connected with the exhaust gas path in a heat-transferring manner. According to the invention, upstream of the channel system a cooling gas outlet is provided, opening into the exhaust gas path, for letting the cooling gas out into the exhaust gas path, through which, in operation, a cooling gas is admixed for cooling the exhaust gas in a needs-based manner.

The arrangement can basically be used in any desired application.

The arrangement can be, for example, a component of a motor vehicle, in particular of a lorry. In the motor vehicle, the internal combustion engine is used, for example, to power the motor vehicle.

The cooling gas can be, at least partially, fresh air with or without a water component, which originates from the environment of the arrangement.

Embodiments are preferred in which the arrangement has a fresh air system for supplying the internal combustion engine and/or other components of the associated motor vehicle, for example a vehicle interior, with fresh air, wherein a fresh air channel connects the cooling gas outlet fluidically with the fresh air system, so that fresh air flows through the cooling gas outlet into the exhaust gas path. In this case, the cooling gas is therefore fresh air from the fresh air system or contains at least fresh air from the fresh air system.

Advantageously, the arrangement has, furthermore, a conveying device which, in operation, conveys fresh air through the fresh air channel and is also designated below as fresh air conveying device. With the fresh air conveying device, an increase of the pressure in the fresh air takes place in operation, in such a way that the latter is delivered to the exhaust gas path upstream of the channel system and is admixed with the exhaust gas.

Basically, the fresh air conveying device can be one which is provided separately for the conveying of the fresh air through the cooling gas outlet. It is preferred if the fresh air conveying device is one which is also used otherwise in the arrangement. In particular, the fresh air conveying device can be a compressor of an exhaust gas turbocharger of the arrangement, which is driven by the exhaust gas. Alternatively or additionally, the fresh air conveying device can be a compressor which for example also provides compressed air to a brake system of an associated motor vehicle.

The admixing of the cooling gas to the exhaust gas upstream of the heat exchanger takes place expediently as required, i.e. when a cooling of the exhaust gas upstream of the heat exchanger is necessary and/or desired. For this purpose, the arrangement has a corresponding device.

Variants are advantageous, in which the arrangement has a valve device which is configured in such a way that it permits an adjusting and/or regulating of the mass flow through the cooling gas outlet. The valve device is arranged here advantageously upstream of the cooling gas outlet. With the valve device, therefore, a needs-based admixing of the cooling gas to the exhaust gas takes place. The arrangement can have, in addition, a control device which operates the valve device accordingly.

Embodiments prove to be advantageous, in which at least partially exhaust gas as cooling gas is admixed to the exhaust gas path via the cooling gas outlet. This has the result that the cooling gas results in a reduced lowering of the temperature in the exhaust gas path upstream of the channel system, because the temperature of the cooling gas generally lies below the ambient temperature. With the same target temperature, the overall mass flow in the exhaust gas path of the channel system therefore increases. Therefore, the coolant, after flowing through the channel system, receives more thermal energy, so that the efficiency of the heat transmission to the cooling medium is increased. This improved heat transmission can be achieved in that the exhaust gas is removed downstream of the channel system, so that a portion of the exhaust gas passes through the channel system several times. In addition, the thus removed and returned exhaust gas has a lower temperature than the exhaust gas upstream of the channel system. Such a configuration is advantageous in particular when the coolant, after flowing through the heat exchanger, emits the received thermal energy, wherein this energy is used elsewhere in the arrangement, therefore in particular when the heat exchanger is integrated via the coolant path in a device for the obtaining and/or converting of thermal energy of the exhaust gas, in particular in an exhaust gas heat recovery device.

For this purpose, the arrangement preferably has an exhaust gas return channel which is separate from the at least one exhaust gas channel and from the at least one coolant channel of the channel system, and connects an exhaust gas removal inlet, arranged upstream of the channel system, in the exhaust gas path fluidically with the cooling gas outlet, in such a way that exhaust gas originating from the exhaust gas removal inlet in operation flows through the cooling gas outlet into the exhaust gas path. In this case, the cooling gas is therefore exhaust gas or at least contains exhaust gas.

It is advantageous if the cooling gas contains both exhaust gas and also fresh air, therefore is a mixture of exhaust gas and fresh air. This allows a cooling of the exhaust gas upstream of the channel system to be adjusted in a needs-based manner.

Alternatively, also without the addition of fresh air by adjusting the mass flow of the returned exhaust gas the temperature can be adjusted in a needs-based manner, as long as the temperature downstream of the channel system lies below the nominal temperature upstream of the channel system. This is usually the case in normal operation.

When the cooling gas is exclusively fresh air, the temperature of the exhaust gas upstream of the heat exchanger can be adjusted in a needs-based manner by adjusting the mass flow of the fresh air.

For introducing exhaust gas, which originates downstream of the channel system, into the exhaust gas path through the cooling gas outlet, the arrangement expediently has a conveying device which is also designated below as exhaust gas conveying device. The exhaust gas conveying device overcomes here in particular the pressure difference in the exhaust gas between the exhaust gas removal inlet and the cooling gas outlet, in such a way that the removed exhaust gas can be returned to the exhaust gas path via the cooling gas outlet. Such an exhaust gas conveying device can be arranged downstream of the exhaust gas removal inlet and upstream of the cooling gas outlet, in particular in the exhaust gas duct.

Alternatively or additionally, a Venturi nozzle can also be provided for overcoming the pressure difference, which nozzle is preferably configured and/or formed by a constriction in the exhaust gas system upstream of the heat exchanger. Here, the cooling gas outlet can be arranged in the Venturi nozzle and/or can open into the Venturi nozzle. With the Venturi nozzle, the generating of a local pressure minimum takes place, which equalizes or reduces said pressure difference. It is also conceivable that the Venturi nozzle is configured and/or arranged in such a way that the local pressure minimum generated with the Venturi nozzle is smaller than the pressure at the removal site of the cooling gas, in particular of the exhaust gas downstream of the heat exchanger. Therefore, a separate conveying device can be omitted.

In this case, through a variable cross-sectional constriction in the Venturi nozzle and/or by throttling the fresh air supply, the temperature of the exhaust gas upstream of the heat exchanger can be adjusted in a needs-based manner.

It is also conceivable to configure the exhaust gas conveying device as a fan or to provide it with a fan, in order to at least equalize the pressure difference.

Embodiments are preferred, in which the arrangement has a suction jet pump which serves as exhaust gas conveying device. The suction jet pump sucks exhaust gas originating from downstream of the channel system in operation and conveys it through the cooling gas outlet into the exhaust gas path upstream of the channel system. This leads to the exhaust gas conveying device, which is exposed to the high temperatures and stresses of the exhaust gas, to have no moving, in particular rotating and/or mounted, components. Therefore, a stability of the exhaust gas conveying device is realized in a simplified, effective and favourably priced manner.

The suction jet pump is advantageously driven by fresh air. Preferably, this fresh air originates from the fresh air system.

The suction jet pump has a drive fluid inlet, a suction inlet and a pump outlet. Preferably the pump outlet is connected fluidically with the cooling gas outlet, the drive fluid inlet is connected fluidically with the fresh air duct, and the suction inlet is connected fluidically with the exhaust gas removal inlet, in particular via the exhaust gas return duct. In addition, the fresh air conveying device is arranged upstream of the drive fluid inlet. The fresh air conveying device therefore drives the fresh air through the drive fluid inlet and therefore the suction jet pump which conveys, via the suction inlet, exhaust gas via the exhaust gas removal inlet, which admixes fresh air and feeds it via the pump outlet and the cooling gas outlet to the exhaust gas path upstream of the channel system.

It is particularly preferred here if the fresh air conveying device is said exhaust gas turbocharger or compressor of the arrangement, so that for introducing the cooling gas into the exhaust gas path upstream of the channel system, no further separate conveying devices are necessary.

It is preferred if upstream of the drive fluid inlet, in particular in the fresh air duct, at least one valve is arranged. The valve permits an adjusting and/or regulating of the mass flow flowing through the cooling gas outlet and therefore of the cooling gas introduced into the exhaust gas path for the cooling of the exhaust gas. Therefore, it is possible to cool the exhaust gas upstream of the channel system in a needs-based manner. Alternatively or additionally, a corresponding adjusting and regulating can take place directly by the conveying capacity of the fresh air conveying device.

The suction jet pump is preferably configured as an air amplifier with Coanda effect. For this purpose, the suction jet pump has, adjoining the suction inlet, an annular chamber and a ring nozzle adjoining thereto, wherein the ring nozzle is connected fluidically with the drive fluid inlet via a Coanda profile. In addition, the fresh air channel is additionally connected fluidically with the pump outlet, bypassing the drive fluid inlet.

Alternatively or additionally, the suction jet pump can have at least one injector.

The fresh air can be used in addition for the cooling of further components, by being directed past or through these components upstream of the cooling gas outlet and, in so doing, receiving heat. Included in such components is an expander of an exhaust gas heat recovery device. Therefore, the volume flow through the suction jet pump, and therefore the efficiency of the suction jet pump, are increased and/or the energy losses on mixing of the two gas streams are reduced.

Expediently, the heat exchanger has a housing with a volume in which the channel system is arranged and through which, in operation, the exhaust gas path and the coolant path lead.

It is preferred if the exhaust gas return duct, separate from the ducts of the channel system, runs at least partially, particularly preferably entirely, within the housing. This leads to the exhaust gas, flowing through the exhaust gas return duct, losing less heat and/or emitting further heat to the coolant, so that as a whole more heat is transferred to the coolant. Therefore, the thermal efficiency of the heat exchanger is improved. In particular, within the housing, a dividing wall can be provided, which separates the ducts of the channel system from the exhaust gas return duct, in particular delimits the volume and/or the exhaust gas duct. Alternatively or additionally, the dividing wall can be an external outer wall of the channel system.

Embodiments are conceivable, in which the arrangement has an exhaust gas treatment device for reducing harmful components of the exhaust gas, which in particular has a catalytic converter or is configured as one such. The exhaust gas treatment device is expediently integrated in the exhaust system, so that the exhaust gas path leads through the exhaust gas treatment device.

Embodiments are also conceivable here, in which the cooling gas outlet opens into the exhaust gas path upstream of the exhaust gas treatment device. Therefore, a cooling of the exhaust gas takes place already before the exhaust gas treatment device, so that the components of the exhaust gas treatment device, in particular of the catalytic converter, can be produced accordingly at a more favourable cost.

The heat exchanger is advantageously a component of a circuit through which the coolant path runs in a circulating manner, in which therefore the coolant circulates. The circuit is configured in particular in the manner of a Rankine process, in which the heat exchanger is used as a vaporizer of the coolant.

The heat exchanger is advantageously a component of an exhaust gas heat recovery device, by which heat transferred from the exhaust gas to the coolant is recovered and returned to the arrangement.

The heat exchanger is configured in the exhaust gas heat recovery device as a vaporizer in which the coolant is vaporized by the heat absorption from the exhaust gas. Expediently, the exhaust gas heat recovery device has, in addition to the vaporizer, an expander for expanding the coolant, wherein with the expander mechanical work can be performed and/or electrical energy can be obtained. It is also conceivable to provide in the exhaust gas heat recovery device a condenser for condensing the coolant.

In particular with the expander therefore an electric current can be generated and/or a mechanical drive can be realized.

The channel system can basically be configured in any desired manner, in so far as it has at least one exhaust gas channel and at least one coolant duct.

The channel system can have in particular a tube bundle, through which, on the one hand, the exhaust gas path and, on the other hand, the coolant path lead. In particular, the channel system can be such a tube bundle.

Alternatively or additionally, the channel system can have a plate heat exchanger, which, on the one hand, is flowed through by the exhaust gas and, on the other hand, is flowed through by the coolant, or can be configured as such a plate heat exchanger.

The internal combustion engine can be operated basically in any desired manner, in so far as, in operation of the internal combustion engine, exhaust gas occurs. The internal combustion engine can be operated in particular with diesel or petrol.

Embodiments are also to be considered, in which the internal combustion engine is operated with natural gas. The natural gas can be, in particular, CNG (Compressed Natural Gas), LNG (Liquified Natural Gas) and/or LPG (Liquified Petroleum Gas). In such internal combustion engines, the exhaust gas has increased temperatures compared to internal combustion engines operated with diesel and/or petrol. Accordingly, the arrangement according to the invention is suitable in particular for such internal combustion engines, because therein heat exchangers can be used which are also used in arrangements with internal combustions engines which are operated with diesel.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to the same or similar or functionally identical components.

BRIEF DESCRIPTION OF THE DRAWINGS

There are shown, respectively diagrammatically.

DETAILED DESCRIPTION

Figure 1:
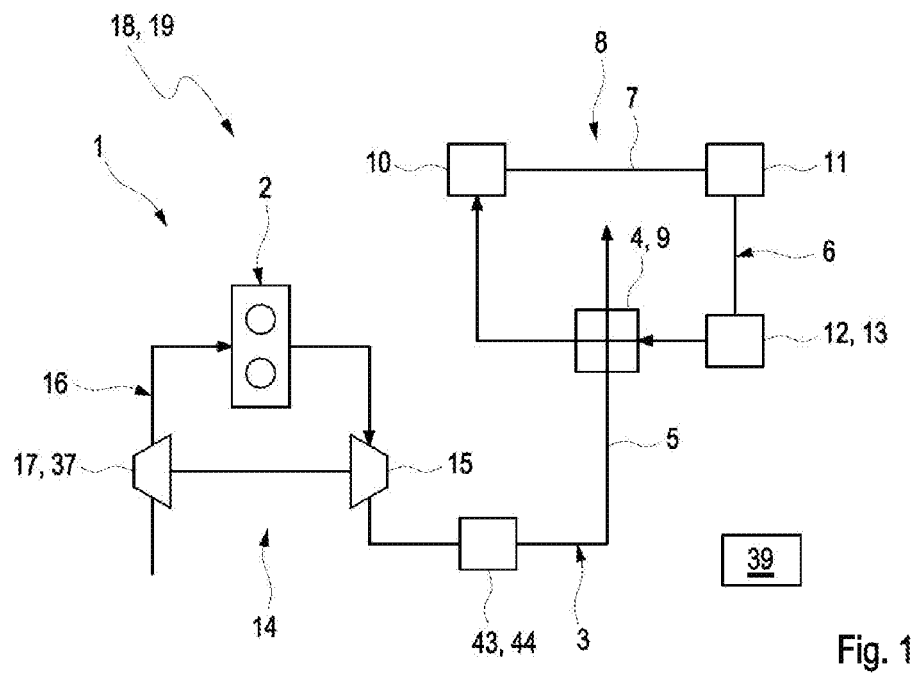
FIG. 1 a highly simplified illustration, in the manner of a circuit diagram, of an arrangement with an internal combustion engine and with a heat exchanger, FIG. 2 a section through the arrangement in the region of the heat exchanger, FIG. 3 the view of FIG. 2 in another example embodiment, FIG. 4 the view of FIG. 3 in a further example embodiment, FIG. 5 the view of FIG. 3 in a further example embodiment.

An arrangement 1, as is illustrated highly simplified and in the manner of a circuit diagram in FIG. 1, has an internal combustion engine 2, an exhaust system 3 and a heat exchanger 4. In the internal combustion engine 2 in operation exhaust gas occurs, which is discharged via the exhaust system 3. With the heat exchanger 4, a cooling of the exhaust gas takes place. The heat exchanger 4 integrated accordingly in the exhaust system 3, in such a way that an exhaust gas path 5 of the exhaust gas, running through the exhaust system 3, leads through the heat exchanger 4. The arrangement 1 has, furthermore, a fresh air system 16, with which, in operation of the internal combustion engine 2, fresh air is supplied. In operation, the internal combustion engine 2 burns a mixture of fresh air and a fuel. With this combustion, the exhaust gas occurs. The fuel can be, in particular, natural gas.

For cooling the exhaust gas, the heat exchanger 4, fluidically separated from the exhaust gas, is flowed through by a coolant which receives heat from the exhaust gas and thus cools the exhaust gas. In the example which is shown, the heat exchanger 4 is a component of a circuit 6, through which a coolant path 7 of the coolant runs in a circulating manner, so that the coolant, in operation, circulates in the circuit 6 and runs here through the heat exchanger 4. The circuit 6 is advantageously operated in the manner of a Rankine process and is preferably a component of an exhaust gas heat recovery device 8, with which heat obtained from the exhaust gas is used elsewhere. The circuit 6 has, in addition to the heat exchanger 4, which serves as vaporizer 9 for vaporizing the coolant, an expander 10, arranged along the coolant path 7 downstream of the heat exchanger 4, for expanding the coolant, a condenser 11, arranged downstream of the expander 10, for condensing the coolant, and a conveying device 12, arranged downstream of the condenser 11 and upstream of the heat exchanger 4, for the conveying of coolant through the circuit 6, also designated below as coolant conveying device 12. The coolant conveying device 12 is configured for example as a coolant pump 13. With the expander 10, kinetic and/or thermal energy can be removed from the coolant and used elsewhere, for example for generating an electric current.

The arrangement 1 can have, furthermore, an exhaust gas turbocharger 14 with a turbine 15, which is integrated in the exhaust system 3 and through which the exhaust gas path 5 leads, and with a compressor 17, which is integrated in the fresh air system 16 and compresses the fresh air in the fresh air system 16.

The arrangement 1 is, in particular, a component of a motor vehicle 18, in particular of a lorry 19, in which the internal combustion engine 2 can be used for powering the motor vehicle 18.

Figure 2:
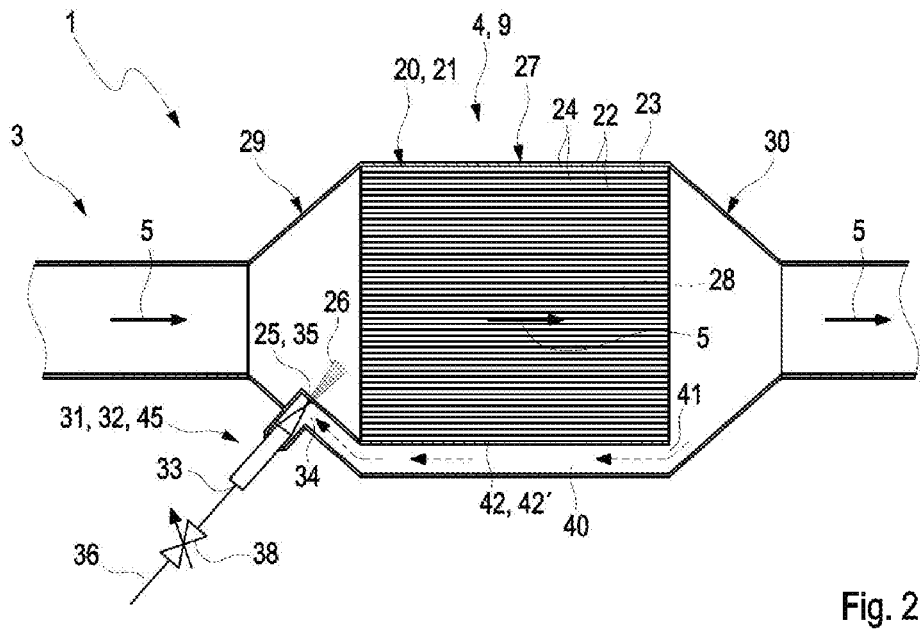

In FIG. 2 a section can be seen through the arrangement 1 in the region of the heat exchanger 4. The heat exchanger 4 has accordingly a channel system 20, which can be configured as a plate heat exchanger 21 or can have such a plate heat exchanger 21. The channel system 20 has at least one exhaust gas channel 22, wherein in the example which is shown several such exhaust gas ducts 22 are provided. In operation, exhaust gas flows through the exhaust gas ducts 22, so that the exhaust gas path 5 leads through the exhaust gas ducts 22. The channel system 20 has, furthermore, at least one coolant channel 24, wherein in the example which is shown several such coolant ducts 24 are provided. The coolant path 7 leads through the coolant ducts 24, fluidically separated from the exhaust gas or respectively from the exhaust gas path 5, but connected therewith in a heat-transferring manner. The exhaust gas ducts 22 and the coolant ducts 24 can be formed by plates 23 of the plate heat exchanger 21 which are spaced apart from one another, in particular delimited thereby.

The arrangement 1 has a cooling gas outlet 25, which opens into the exhaust gas path 5 upstream of the channel system 20, so that a cooling gas 26 can be introduced into the exhaust gas path 5 upstream of the channel system 20. The cooling gas 26 is therefore admixed with the exhaust gas, so that the temperature of the mixture of cooling gas 26 and exhaust gas is reduced upstream of the channel system 20. Accordingly, the channel system 20 can be produced from more favourably priced materials and/or is less exposed to thermal and/or thermo-chemical stresses, so that the stability of the heat exchanger 4 and therefore of the entire arrangement 1 is improved.

In the example which is shown, the heat exchanger 4 has a housing 27, which has a volume 28 in which the channel system 20 is arranged and through which the exhaust gas path 5 and the coolant path 7 lead. The arrangement 1 has, furthermore, along the exhaust gas path 5 upstream of the channel system 20, a diffusor 29, through which the exhaust gas path 5 leads, wherein the diffusor 29 in the direction of the exhaust gas path 5 has an enlarging cross-section which is able to be flowed through. In the direction of the exhaust gas path 5 downstream of the channel system 20, the arrangement 1 has a nozzle 30, through which the exhaust gas path 5 leads and which has, in the direction of the exhaust gas path 5, a diminishing cross-section which is able to be flowed through. In the example which is shown, the diffusor 29 and the nozzle 30 directly adjoin the channel system 20. In the example which is shown, the diffusor 29 and the nozzle 30 are, in addition, components of the housing 27, in particular are produced together with the housing 27.

The cooling gas 26 is conveyed through the cooling gas outlet 25 by means of a suction jet pump 31, and is brought into the exhaust gas path 5 upstream of the channel system 20. The suction jet pump 31 is configured for example as an air amplifier 32. The suction jet pump 1 has a drive fluid inlet 33 and a pump outlet 35, wherein in the example which is shown the pump outlet 35 corresponds to the cooling gas outlet 25. The drive fluid inlet 33 is connected fluidically with the fresh air system 16 via a fresh air channel 36, merely indicated in FIG. 2, in such a way that the compressor 17 as conveying device 37, designated below as fresh air conveying device 37, conveys fresh air through the fresh air channel 36 and into the drive fluid inlet 33. Accordingly, the fresh air channel 36 is connected with the fresh air system 16 upstream of the compressor 17. The fresh air channel 36 can be connected with the expander 10 in a heat-transferring manner upstream of the drive fluid inlet 33 (not shown), so that in operation upstream of the drive fluid inlet 33 heat of the expander 10 is transferred to the fresh air. In the fresh air channel 36 and upstream of the drive fluid inlet 33 a controllable valve 38 is arranged, which is connected in a communicating manner with a control device 39, merely indicated in FIG. 1, in such a way that the control device 39 can actuate and adjust the valve 38. Therefore it is possible to alter the flow into the drive fluid inlet 33, here therefore the flow of fresh air as drive gas, through the suction jet pump 31 and consequently the mass flow of the cooling gas 26 into the exhaust gas path 5 in a needs-based manner.

The suction inlet 34 of the suction jet pump 31 is fluidically connected via an exhaust gas return channel 40 with an exhaust gas removal inlet 41 arranged along the exhaust gas path 5 downstream of the channel system 20, wherein the exhaust gas removal inlet 41 is arranged in such a way that exhaust gas flowing downstream of the channel system 20 can flow into the exhaust gas removal inlet 41. The suction jet pump 31 sucks exhaust gas here via the suction inlet 34 through the exhaust gas removal inlet 41 and the exhaust gas return channel 40, wherein this exhaust gas, as indicated by dashed arrows, is admixed with the fresh air and through the pump outlet 35 or respectively the cooling gas outlet 25 upstream of the channel system 20 is admixed with the exhaust gas path 5 or respectively with the exhaust gas. In the example which is shown, the cooling gas 26 is therefore a mixture of fresh air and exhaust gas originating downstream of the channel system 20. The suction jet pump 31 serves here as an exhaust gas conveying device 45 for the exhaust gas through the exhaust gas return channel 40.

In the example which is shown, the cooling gas outlet 25 is arranged in the diffusor 29, in particular is formed in the diffusor 29. In addition, the exhaust gas removal inlet 41 is arranged in the nozzle 30.

In the example which is shown, the exhaust gas channel 40 is arranged entirely within the housing 27 and adjacent to the channel system 20. For this purpose, the heat exchanger 4 within the housing 27 has a dividing wall 42, which delimits on the one hand the exhaust gas channel 40 and on the other hand the volume 28. It is also conceivable that the dividing wall 42 is an outer wall 42' of the channel system 20.

Alternatively to the arrangement of the cooling gas outlet 25 which is shown, it is conceivable to arrange the cooling gas outlet 25 upstream of an exhaust gas treatment device 43, indicated in FIG. 1, in particular a catalytic converter 44, for the treatment of the exhaust gas for the purpose of reducing harmful components in the exhaust gas. The exhaust gas treatment device 32 is arranged here along the exhaust gas path 5 expediently upstream of the heat exchanger 4.

Figure 3:
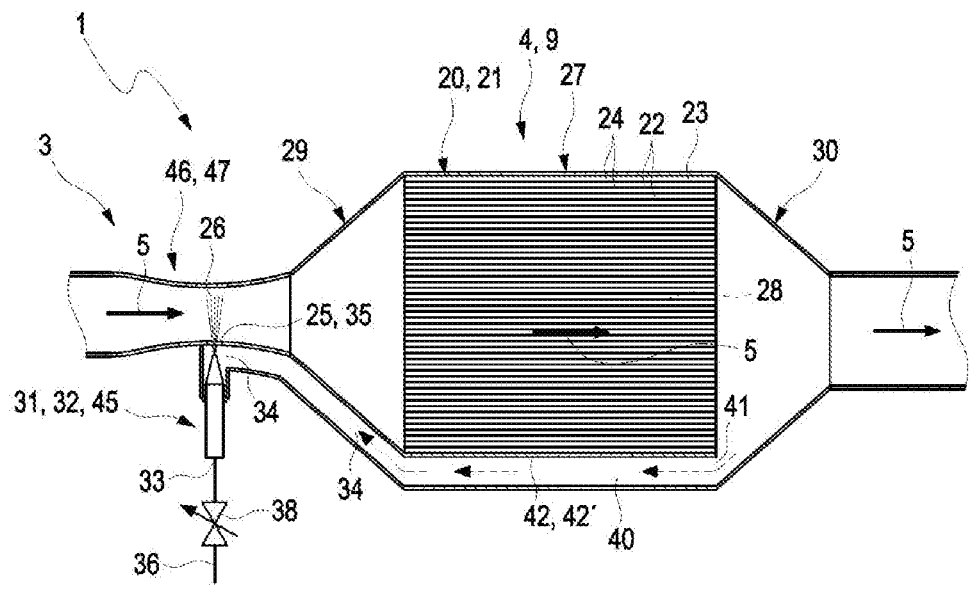

FIG. 3 shows another example embodiment of the arrangement 1. This example embodiment differs from the example shown in FIG. 2 in that in the exhaust gas system 3 upstream of the heat exchanger 4 a Venturi nozzle 47 is formed or respectively exists by a constriction 47 in the exhaust system 3. In the example which is shown, the Venturi nozzle 47 or respectively the constriction 47 is arranged upstream of the diffusor 29. In this example, the pump outlet 35 of the suction jet pump 31 and therefore of the cooling gas outlet 25 opens into the Venturi nozzle 46 or respectively into the constriction 47.

Figure 4:
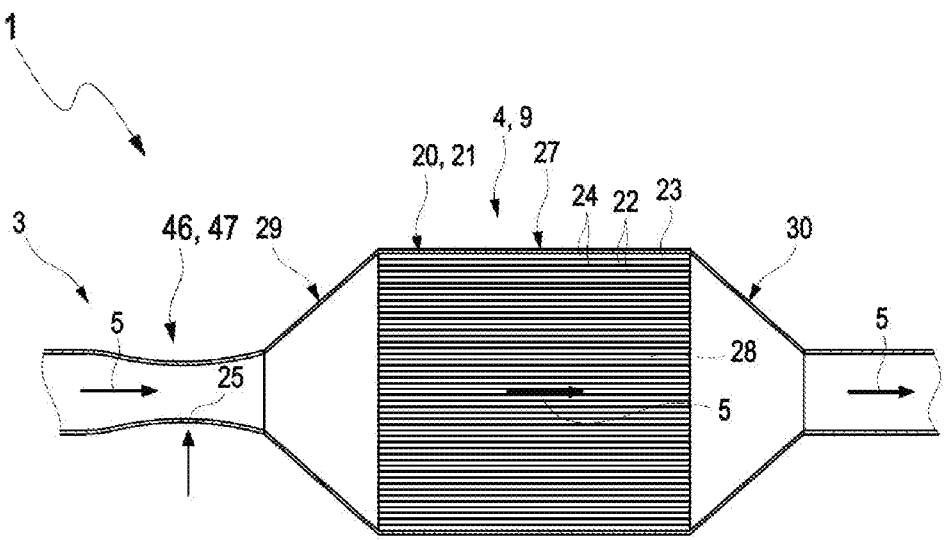

A further example embodiment of the arrangement 1 is shown in FIG. 4. This example embodiment differs from the example shown in FIG. 3 in that the arrangement 1 has no suction jet pump 31. In addition, in this example embodiment the exhaust gas channel 40 and the exhaust gas removal inlet 41 are omitted. The cooling gas inlet 25 opens into the Venturi nozzle 46 or respectively the constriction 47. Here, the Venturi nozzle 47 is configured in such a way that, in operation, the pressure in the Venturi nozzle 47 is less than the pressure of the air in the environment. Consequently, in operation, as indicated by an arrow, air is sucked from the environment as cooling gas and is admixed with the exhaust gas.

Figure 5:
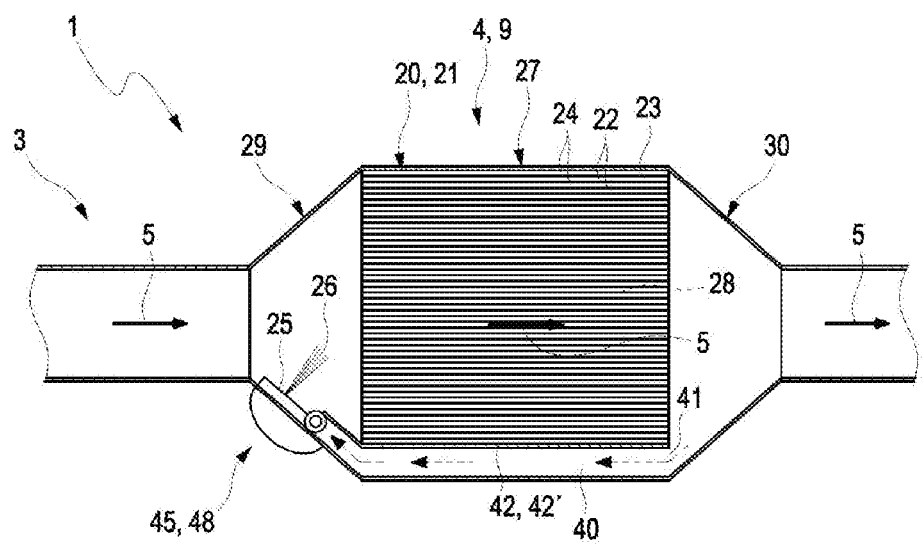

A further example embodiment of the arrangement 1 is shown in FIG. 5. This example embodiment differs from the example shown in FIG. 2 in that the exhaust gas conveying device 45 is configured as a fan 48. In operation, the fan 48 overcomes the pressure difference in the exhaust gas between the exhaust gas removal inlet 41 and the cooling gas outlet 25, so that the exhaust gas removed via the exhaust gas removal inlet 41 is admixed with the exhaust gas via the cooling gas outlet 26 upstream of the heat exchanger 4.

The invention claimed is:

1. An arrangement for a motor vehicle, comprising:
    an internal combustion engine in which, in operation, an exhaust gas is present,
    an exhaust system for discharging the exhaust gas, through which an exhaust gas path of the exhaust gas leads,
    a heat exchanger for cooling the exhaust gas, the heat exchanger including a channel system and a diffusor arranged along the exhaust gas path upstream of the channel system,
    wherein the channel system has at least one exhaust gas channel, through which the exhaust gas path leads, and at least one coolant channel, through which a coolant path of a coolant leads, fluidically separate from the exhaust gas path and arranged in a heat-transferring manner with the exhaust gas path, such that, in operation, the exhaust gas exchanges heat with the coolant,
    a cooling gas outlet, arranged in the diffusor and opening into the exhaust gas path upstream of the channel system, for introducing a cooling gas into the exhaust gas path upstream of the channel system, and
    wherein the heat exchanger further includes a housing and the diffusor is part of the housing and directly adjoins the channel system.

2. The arrangement according to claim 1, further comprising a fresh air channel fluidically connected to the cooling gas outlet, such that fresh air flows via the fresh air channel through the cooling gas outlet into the exhaust gas path.

3. The arrangement according to claim 2, further comprising a fresh air conveyor comprising a fan, an exhaust gas turbocharger, or a compressor which, in operation, conveys fresh air through the fresh air channel.

4. The arrangement according to claim 3, further comprising:
    a suction jet pump with a drive fluid inlet, a suction inlet and a pump outlet,
    the pump outlet is fluidically connected with the cooling gas outlet or corresponds to the cooling gas outlet, the drive fluid inlet is fluidically connected with the fresh air channel and the fresh air conveyor is arranged upstream of the drive fluid inlet, and the suction inlet is fluidically connected with an exhaust gas removal inlet.

5. The arrangement according to claim 4, wherein the suction jet pump is configured as an air amplifier with Coanda effect.

6. The arrangement according to claim 2, further comprising a circuit through which the coolant path runs in a circulating manner, wherein the circuit is a component of an exhaust gas heat recovery device, and wherein the fresh air channel upstream of the cooling gas outlet is connected in a heat-transferring manner with the exhaust gas heat recovery device, such that, in operation, fresh air flowing through the fresh air channel receives heat from the exhaust gas heat recovery device.

7. The arrangement according to claim 1, further comprising an exhaust gas return channel that connects an exhaust gas removal inlet arranged downstream of the channel system in the exhaust gas path fluidically with the cooling gas outlet, such that exhaust gas originating from the exhaust gas removal inlet in operation flows through the cooling gas outlet upstream of the channel system into the exhaust gas path.

8. The arrangement according to claim 7, wherein:
the heat exchanger has a housing with a volume and the channel system is arranged in the volume, and
the exhaust gas return channel is separate from the channel system and runs at least partially within the housing.

9. The arrangement according to claim 7, further comprising a suction jet pump including a drive fluid inlet, a suction inlet and a pump outlet;
the pump outlet being fluidically connected with the cooling gas outlet;
the drive fluid inlet being fluidically connected with the fresh air channel, and the fresh air conveying device being arranged upstream of the drive fluid inlet; and
the suction inlet being fluidically connected with the exhaust gas removal inlet.

10. The arrangement according to claim 9, wherein the heat exchanger has a housing with a volume and the channel system is arranged in the volume, and wherein the exhaust gas return channel is separate from the channel system and runs at least partially within the housing.

11. The arrangement according to claim 1, wherein the exhaust gas path upstream of the heat exchanger leads through an exhaust gas treatment device for reducing harmful components of the exhaust gas, wherein the cooling gas outlet upstream of the exhaust gas treatment device opens into the exhaust gas path.

12. The arrangement according to claim 11, wherein the exhaust gas treatment device comprises a catalytic converter.

13. The arrangement according to claim 1, further comprising a circuit, through which the coolant path runs in a circulating manner.

14. The arrangement according to claim 13, wherein the circuit is a component of an exhaust gas heat recovery device.

15. The arrangement according to claim 14, wherein the internal combustion engine is operated with natural gas.

16. The arrangement according to claim 1, wherein the internal combustion engine is operated with natural gas.

17. An arrangement for a motor vehicle, comprising:
an internal combustion engine in which, in operation, an exhaust gas is present,
an exhaust system for discharging the exhaust gas, through which an exhaust gas path of the exhaust gas leads,
a heat exchanger for cooling the exhaust gas, the heat exchanger including a channel system,
the channel system including at least one exhaust gas channel, through which the exhaust gas path leads, and at least one coolant channel, through which a coolant path of a coolant leads, fluidically separate from the exhaust gas path and arranged in a heat-transferring manner with the exhaust gas path, such that, in operation, the exhaust gas exchanges heat with the coolant,
a cooling gas outlet, opening into the exhaust gas path upstream of the channel system, for introducing a cooling gas into the exhaust gas path upstream of the channel system, and
wherein the exhaust gas path upstream of the heat exchanger leads through a Venturi nozzle, and wherein the cooling gas outlet opens into the Venturi nozzle.

18. The arrangement according to claim 17, wherein the Venturi nozzle is structured and arranged such that, in operation, a pressure in the Venturi nozzle is less than a pressure of the air in the environment, and such that the air is sucked from the environment.

19. An arrangement for a motor vehicle, comprising:
a heat exchanger for cooling an exhaust gas and including a channel system, wherein the channel system has at least one exhaust gas channel, through which an exhaust gas path leads, and at least one coolant channel, through which a coolant path of a coolant leads, fluidically separate from the exhaust gas path and arranged in a heat-transferring manner with the exhaust gas path, such that, in operation, the exhaust gas exchanges heat with the coolant,
a cooling gas outlet, opening into the exhaust gas path upstream of the channel system, structured and arranged to introduce a cooling gas into the exhaust gas path upstream of the channel system;
a fresh air channel fluidically connected to the cooling gas outlet such that fresh air flows via the fresh air channel through the cooling gas outlet into the exhaust gas path; and
an exhaust gas return channel that connects an exhaust gas removal inlet arranged downstream of the channel system in the exhaust gas path fluidically with the cooling gas outlet, such that exhaust gas originating from the exhaust gas removal inlet in operation flows through the cooling gas outlet upstream of the channel system into the exhaust gas path.

* * * * *